United States Patent [19]
Oogi et al.

[11] Patent Number: 5,267,114
[45] Date of Patent: Nov. 30, 1993

[54] TAPE CASSETTE WITH SPRING-BIASED HUB BRAKE

[75] Inventors: Takashi Oogi; Tsuyoshi Ohta, both of Miyagi, Japan

[73] Assignee: Sony Corporation, Tokyo, Japan

[21] Appl. No.: 802,405

[22] Filed: Dec. 4, 1991

[30] Foreign Application Priority Data

Dec. 10, 1990 [JP] Japan ................... 2-407206
Dec. 10, 1990 [JP] Japan ................... 2-407208
Dec. 10, 1990 [JP] Japan ................... 2-407209

[51] Int. Cl.[5] ............... G11B 23/087; G11B 15/22
[52] U.S. Cl. .................. 360/132; 242/198; 242/199
[58] Field of Search ............ 360/132; 242/199, 198, 242/197, 200, 204

[56] References Cited

U.S. PATENT DOCUMENTS

| | | | |
|---|---|---|---|
| 4,029,268 | 6/1977 | Schoettle et al. | 242/198 |
| 4,225,100 | 9/1980 | Sugawara | 360/132 |
| 4,671,469 | 6/1987 | Ikebe et al. | 360/132 |
| 4,676,453 | 6/1987 | Komiyama et al. | 242/199 |
| 4,757,957 | 7/1988 | Nakatamari et al. | 242/198 |
| 4,841,403 | 6/1989 | Tsuruta et al. | 360/132 |
| 4,884,159 | 11/1989 | Satoh | 242/198 |

FOREIGN PATENT DOCUMENTS

| | | | |
|---|---|---|---|
| 0129380 | 1/1978 | German Democratic Rep. | 360/132 |
| 62-134877 | 6/1987 | Japan | 360/132 |
| 2167386 | 5/1986 | United Kingdom . | |

OTHER PUBLICATIONS

Patent Abstracts of Japan, vol. 9, No. 190 (P-378), Aug. 7, 1985, 60-57586 (A) (Apr. 3, 1985).

*Primary Examiner*—John H. Wolff
*Assistant Examiner*—Craig A. Renner
*Attorney, Agent, or Firm*—Lewis H. Eslinger; Jay H. Maioli

[57] ABSTRACT

In a tape cassette including a brake member and a wire-shaped brake spring supported at its opposite ends by the brake member, the brake member is biased by the brake spring to come into pressure contact with hubs and thereby lock the hubs. One end of the brake spring is completely fixed to the brake member, and the other end of the brake spring is supported by the brake member with a degree of freedom parallel to the axial direction of the brake spring. The brake member has a guide recess opened at one end thereof and is adapted to be slidably moved to effect hub locking and unlocking operations while being guided by a guide pin formed in a cassette case, the guide pin being inserted through the guide recess. The opened end of the guide recess diverges to form a tapering portion so that the guide pin may be smoothly introduced into the guide recess upon sliding movement of the brake member.

14 Claims, 11 Drawing Sheets

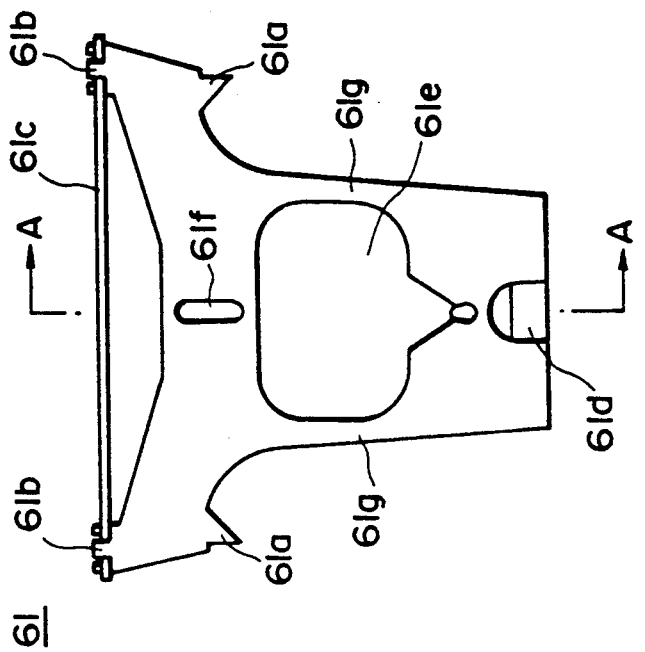
FIG. 3A PRIOR ART
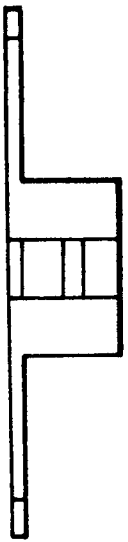
FIG. 3D PRIOR ART
FIG. 3B PRIOR ART
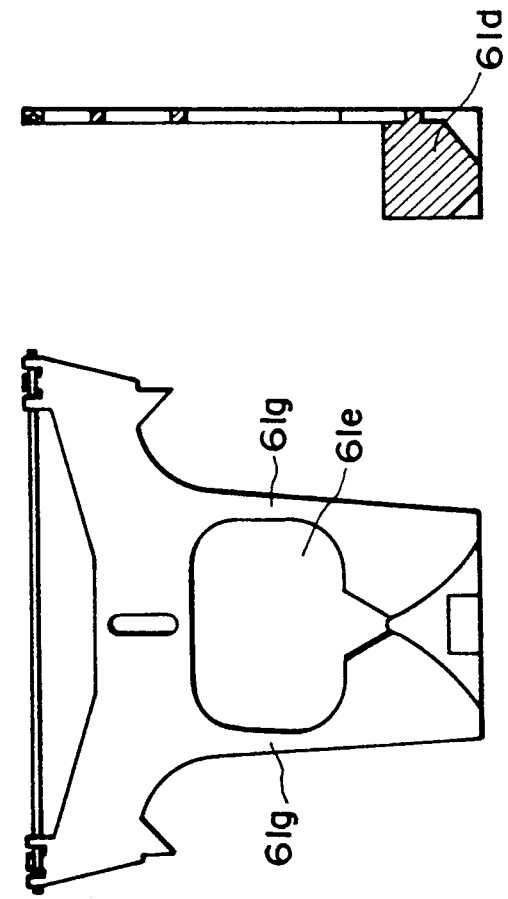
FIG. 3C PRIOR ART

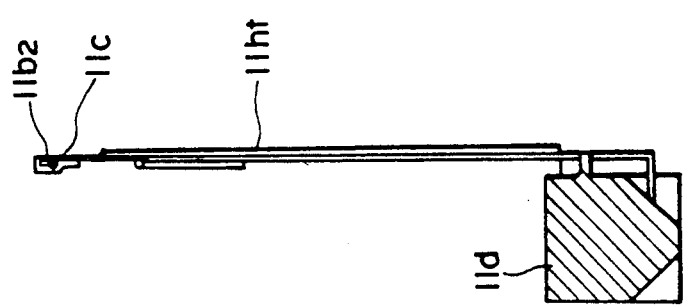
FIG. 9C
FIG. 9B
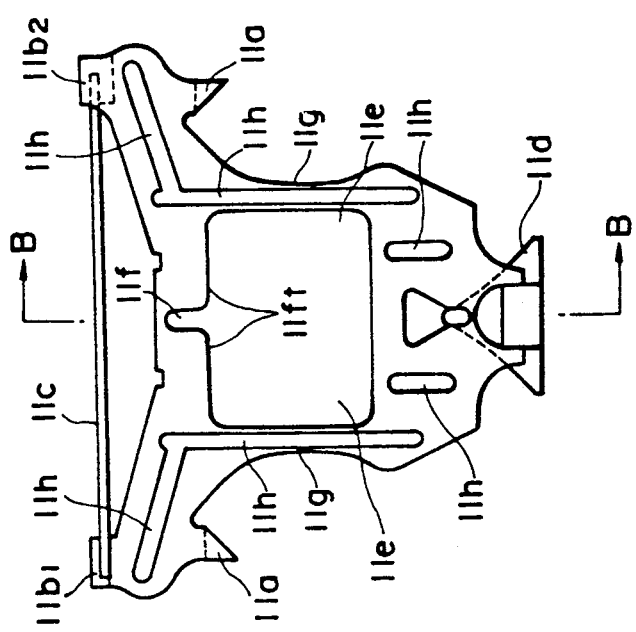
FIG. 9A

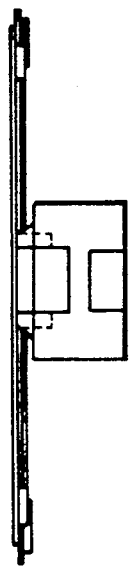
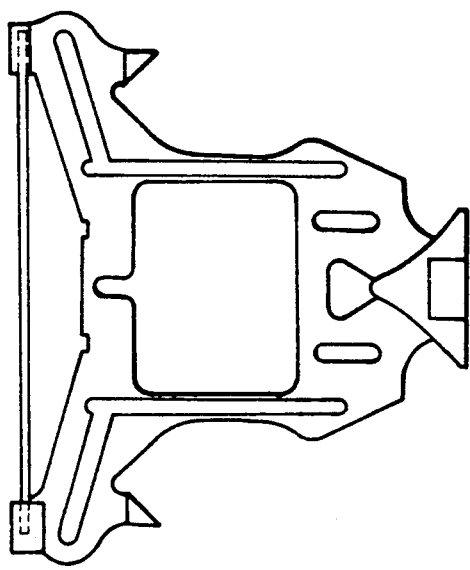
FIG.9E
FIG.9D

FIG.10A
FIG.10B
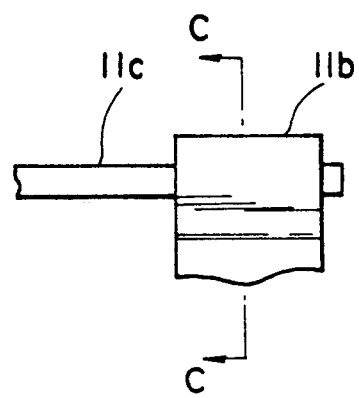
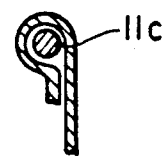
FIG. 11A
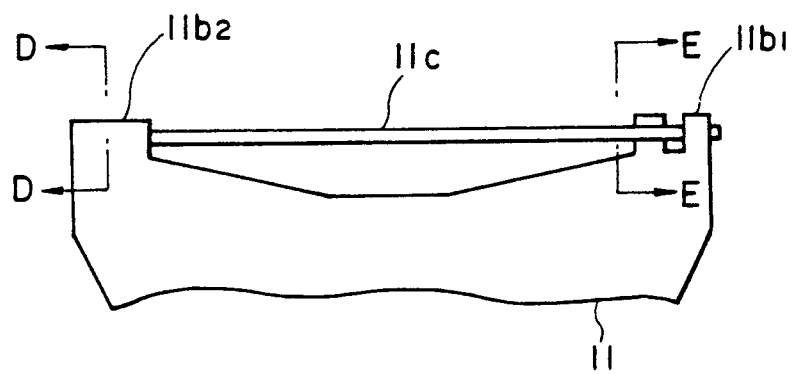
FIG. 11B
FIG. 11C
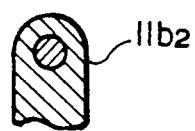
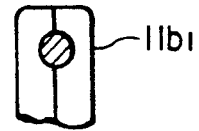

TAPE CASSETTE WITH SPRING-BIASED HUB BRAKE

BACKGROUND OF THE INVENTION

The present invention relates to a tape cassette provided with a brake member for locking undue rotation of hubs in an inoperative condition of the tape cassette.

As a tape cassette for carrying out high-density recording of a video signal or a PCM signal, such as ½-inch video tape cassette or 8-mm video tape cassette, there have been practically used various kinds of tape cassettes including a brake member for nonrotatably locking hubs in order to prevent slacking of a magnetic tape in an inoperative (storage) condition of the tape cassettes.

In the inoperative condition of the tape cassettes, such a brake member is biased by a biasing force of a spring to come into pressure contact with the hubs and thereby nonrotatably lock the hubs. In an operative condition of the tape cassettes, the brake member is moved away from the hubs by a lock release pin to be inserted from the outside of a cassette case, thereby releasing the locked condition of the hubs.

FIGS. 1A, 1B, 2A and 2B illustrate the operation of such a brake member, wherein FIGS. 1A and 2A show operational conditions as viewed in plan, and FIGS. 1B and 2B show the operational conditions as viewed in side elevation. In these figures, reference numeral 63 denotes a cassette case of a tape cassette, which is shown by a one-dot chain line. The cassette case 63 accommodates a brake member 61, a pair of reel hubs 62, and a magnetic tape T wound around the reel hubs 62.

The brake member 61 is provided with a pair of engaging pawls 61a adapted to contact engaging teeth 62a like gear rings formed on the reel hubs 62 and thereby lock the rotation of the reel hubs 62. A brake spring 61c formed from a stainless steel wire is fixed to a pair of spring holding portions 61b of the brake member 61. In a normal (inoperative) condition of the tape cassette, the brake spring 61c is in pressure contact with an abutment portion 64 provided in the cassette case 63. Accordingly, a biasing force of the brake spring 61c is normally applied to the brake member 61 in such a direction as to engage the engaging pawls 61a of the brake member 61 with the engaging teeth 62a of the reel hubs 62, thereby maintaining a locked condition of the reel hubs 62 as shown in FIGS. 1A and 1B.

On the other hand, when the tape cassette is loaded into a tape player, a lock release pin 65 provided in the tape player is inserted from an insertion hole 63a formed through the cassette case 63 as shown in FIG. 2B. As a result, the lock release pin 65 comes into contact with an inclined cam portion 61d of the brake member 61 located in opposition to the insertion hole 63a, and urges the brake member 61 against the biasing force of the brake spring 61c, with the result that the engagement of the engaging pawls 61a of the brake member 61 with the engaging teeth 62a of the reel hubs 62 is released to thereby bring the reel hubs 62 into a rotatable condition as shown in FIG. 2A.

Reference numeral 63b shown by a one-dot chain line denotes a window portion formed through an upper half of the cassette case 63. Although not shown, a similar window portion is also formed through a lower half of the cassette case 63. These window portions 63b are molded from transparent resin. By the provision of the window portions 63b, a residual quantity of the magnetic tape T may be confirmed from the outside of the cassette case 63. The brake member 61 is provided with an aperture 61e at a position corresponding to the window portions 63b, so that the residual quantity of the magnetic tape T may be confirmed from the window portion 63b on the side of the brake member 61 through the aperture 61e.

The brake member 61 is further provided with a guide hole 61f for guiding sliding movement of the brake member 61 from the hub locked condition to the hub unlocked condition. A guide pin 66 fixed in the cassette case 63 is inserted in the guide hole 61f.

FIGS. 3A, 3B, 3C, and 3D are a top plan view of the brake member 61 in the prior art by way of example, a cross section taken along the line A—A in FIG. 3A, a bottom plan view of the brake member 61 shown in FIG. 3A, and an elevational view of the brake member 61 shown in FIG. 3A, respectively.

As mentioned above, the sliding movement of the brake member 61 for the hub locking operation and the hub unlocking operation is effected primarily by the cooperation of the engaging pawls 61a, the spring holding portions 61b, the brake spring 61c formed from a stainless steel wire or the like, and the inclined cam portion 61d. The entirety of the brake member 61 except the brake spring 61c is molded from engineering plastics (mainly, POM) in consideration of a wear resistance to the lock release pin 65 (normally, metal such as SUS) in the tape player and a sliding property with respect to an inner surface of the cassette case 63. As shown in FIGS. 3A to 3D, the brake spring 61c is supported at its opposite ends by the spring holding portions 61b in such a manner that the opposite ends are nipped by the spring holding portions 61b each of which is formed in a zigzag shape.

However, in the conventional brake member 61 having the brake spring 61c merely supported at its opposite ends, the brake spring 61c is slidable in an axial direction thereof, causing possible disconnection of the brake spring 61c in the axial direction from the spring holding portions 61b. Accordingly, there arise the problems of reduction in workability in installation of the brake member and reduction in reliability in the braking operation.

As apparent from FIGS. 1B and 2B, a portion of the brake member 61 except the inclined cam portion 61d must be accommodated between the magnetic tape T and the inner surface of the cassette case 63. Thus, a thickness of the portion of the brake member 61 except the inclined cam portion 61d is greatly limited. For example, in a micro tape cassette for recording a PCM signal which has been recently developed, the adoption of the brake member 61 requires that the thickness of the portion of the brake member 61 except the inclined cam portion 61d is to be set to about 0.4 mm or less. Accordingly, a thickness of the spring holding portions 61b is also limited in accordance with this set value. However, if the spring holding portions 61b are formed by molding, a minimum thickness of the spring holding portions 61b is about 0.4 mm, and this thickness is hard to reduce.

Accordingly, even if the brake spring 61c formed from a stainless steel wire having a very small diameter of about 0.2 mm, for example, is intended to be supported or fixed by insert molding to the spring holding portions 61b, the fixing itself of the brake spring 61c is difficult or it is difficult to securely fix the brake spring 61c because there is no room in the thickness direction of the spring holding portions 61b.

Further, as mentioned above, the brake member 61 is provided with the aperture 61e so as not to hinder the confirmation of a residual quantity of the magnetic tape T from the window portions 63b of the cassette case 63. By the provision of the aperture 61e, a central portion of the brake member 61 is almost occupied by the aperture 61e, and a sufficient rigidity of side portions 61g formed on opposite sides of the aperture 61e cannot be obtained. As mentioned above, the brake member 61 is slidably moved in the same direction as that of flexing of the brake spring 61c to be effected by the cooperation of the lock release pin 65 with the inclined cam portion 61d. Accordingly, if the rigidity of the side portions 61g is insufficient, they are apt to be flexed in a thickness direction thereof, causing a deterioration in braking operation. Moreover, when the side portions 61g are flexed, they come into contact with the magnetic tape T wound around the reel hubs 62, causing an increase in loss torque and a deterioration in tape running. In this manner, a reduction in the rigidity of the brake member 61 is greatly undesirable.

Further, if the window portions of the cassette case 63 are larger in size than the window portions 63b as shown, the size of the aperture 61e of the brake member 61 must also be increased. In this case, as a sufficient space for forming the guide hole 61f does not remain in the brake member 61, it is obliged that a guide recess 61f' continuing to the aperture 61e as shown in FIG. 4 is to be formed in the brake member 61. That is, the guide recess 61f' is opened at one end thereof to the aperture 61e, and the guide pin 66 is adapted to be inserted through the guide recess 61f'.

In the hub locked condition, the guide pin 66 is located at a position 66a relative to the guide recess 61f', and in the hub unlocked condition, the guide pin 66 is located at a position 66b relative to the guide recess 61f'. Thus, in the hub unlocked condition, the guide pin 66 is located outside the guide recess 61f'. It is therefore necessary to accurately introduce the guide pin 66 into the guide recess 61f' in bringing the brake member 61 into the hub locked condition again.

However, if the brake member 61 is slipped in position even a little upon unlocking the hubs, it cannot be expected that the guide pin 66 is smoothly introduced into the guide recess 61f' by the sliding movement of the brake member 61 in locking the hubs again. In many cases, the guide pin 66 comes against a periphery of the opened one end of the guide recess 61f', thus hindering the sliding movement of the brake member 61. As a matter of course, a proper hub locking operation cannot be exhibited.

SUMMARY OF THE INVENTION

It is a first object of the present invention to provide a micro tape cassette.

It is a second object of the present invention to provide a micro tape cassette which can be manufactured with a high efficiency.

It is a third object of the present invention to provide a micro tape cassette which can be easily assembled.

It is a fourth object of the present invention to provide a micro tape cassette in which a movable member can be smoothly operated.

It is a fifth object of the present invention to provide a micro tape cassette which has a sufficient strength.

The present invention has been achieved to solve the above problems. According to a first aspect of the present invention, a tape cassette provided with a brake member adapted to lock and unlock hubs and a wire-shaped spring member supported by the brake member is characterized in that one end of the spring member is completely fixed to the brake member, and the other end of the spring member is supported by the brake member with a degree of freedom defined in an axial direction of the spring member.

As the spring member is completely fixed at its one end to the brake member, the disconnection of the spring member from the brake member can be prevented. Further, the fixing of the spring member to the brake member can be carried out in a manufacturing step of the brake member.

According to a second aspect of the present invention, a tape cassette provided with a brake member adapted to lock and unlock hubs, a spring member for biasing the brake member to bring same into pressure contact with the hubs, and an inclined cam portion for moving the brake member against a biasing force of the spring member away from the hubs is characterized in that the brake member is composed of a sheet metal portion and a molded portion, the sheet metal portion having at least a spring holding portion for holding the spring member, the molded portion having at least the inclined cam portion, the sheet metal portion being integrally fixed to the molded portion. Further, in the case that a cassette case of the tape cassette is provided with a window, the brake member has an aperture corresponding to the window of the cassette case, the sheet metal portion of the brake member having at least side portions formed on opposite sides of the aperture, the molded portion of the brake member having at least the inclined cam portion, the sheet metal portion being integrally fixed to the molded portion.

As the spring holding portion is formed by sheet metal working, a thickness of the spring holding portion itself can be reduced to thereby obtain a room in a thickness direction. Accordingly, the spring member can be securely fixed even in a thickness dimension which is greatly limited. Further, as the side portions formed on the opposite sides of the aperture corresponding to the window of the cassette case are formed by sheet metal working, a sufficient rigidity of the side portions can be obtained.

According to a third aspect of the present invention, a tape cassette including a magnetic tape, a pair of hubs for winding the magnetic tape therearound, a brake member adapted to be slidably moved to and away from circumferential surfaces of the hubs, the brake member having a guide hole opened at one end thereof, and a cassette case having a guide pin adapted to be inserted through the guide hole, whereby locking and unlocking operations for the hubs are effected by sliding movement of the brake member as being guided by the guide pin inserted through the guide hole is characterized in that the opened one end of the guide hole is divergent to form a tapering portion so that the guide pin may be smoothly introduced from the opened one end into the guide hole upon sliding movement of the brake member.

During the sliding movement of the brake member from the hub unlocked position to the hub locked position, the guide pin is introduced from the opened one end of the guide hole into the guide hole to guide the sliding movement. In this case, as the opened one end of the guide hole is divergent to form a tapering portion, the guide pin is guided by the tapering portion to be smoothly introduced into the guide hole. Accordingly, the sliding movement of the brake member can be well guided.

Other objects and features of the invention will be more fully understood from the following detailed description and appended claims when taken with the accompanying drawings.

BRIEF DESCRIPTION OF THE DRAWINGS

FIGS. 3A, 3B, 3C, and 3D are a top plan view of the brake member in the prior art, a cross section taken along the line A—A in FIG. 3A, a bottom plan view of the brake member shown in FIG. 3A, and an elevational view of the brake member shown in FIG. 3A, respectively;

FIGS. 9A, 9B, 9C, 9D and 9E are a top plan view of the brake member in the preferred embodiment of the present invention, a cross section taken along the line B—B in FIG. 9A, a fragmentary side view of the brake member shown in FIG. 9A, a bottom plan view of the brake member shown in FIG. 9A, and an elevational view of the brake member shown in FIG. 9A, respectively;

FIGS. 10A and 10B are a fragmentary bottom plan view of a modification of the spring holding portion of the brake member and a cross section taken along the line C—C in FIG. 10A, respectively;

FIGS. 11A, 11B, and 11C are a fragmentary bottom plan view of the brake member in another preferred embodiment of the present invention, an enlarged cross section taken along the line D—D in FIG. 11A, and an enlarged cross section taken along the line E—E in FIG. 11A, respectively.

DETAILED DESCRIPTION OF THE PREFERRED EMBODIMENTS

A preferred embodiment of the tape cassette according to the present invention will now be described with reference to the drawings. The tape cassette in this preferred embodiment has a micro construction.

Figure 1B:
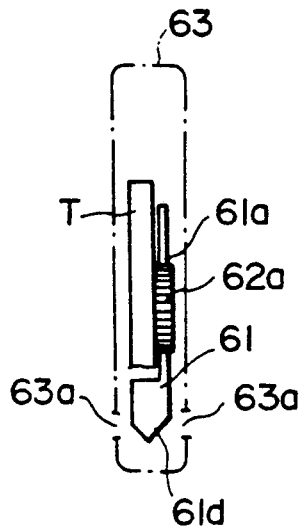
FIGS. 1A and 1B are schematic plan and side views of the hub braking mechanism in the prior art, illustrating a hub locked condition.
Figure 1A:
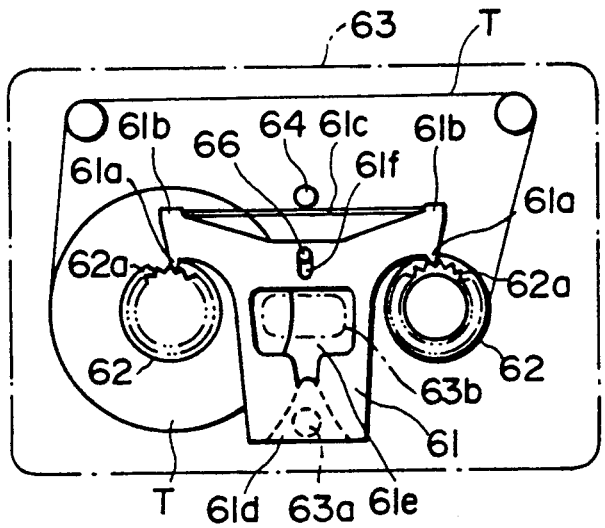
Figure 2B:
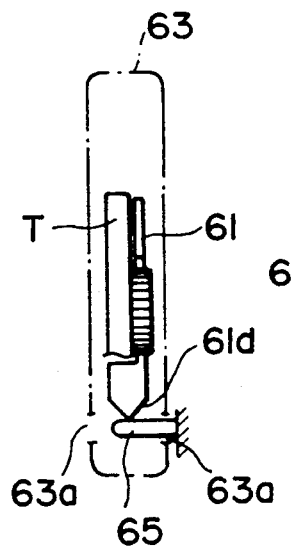
FIGS. 2A and 2B are schematic plan and side views of the hub braking mechanism in the prior art, illustrating a hub unlocked condition.
Figure 2A:
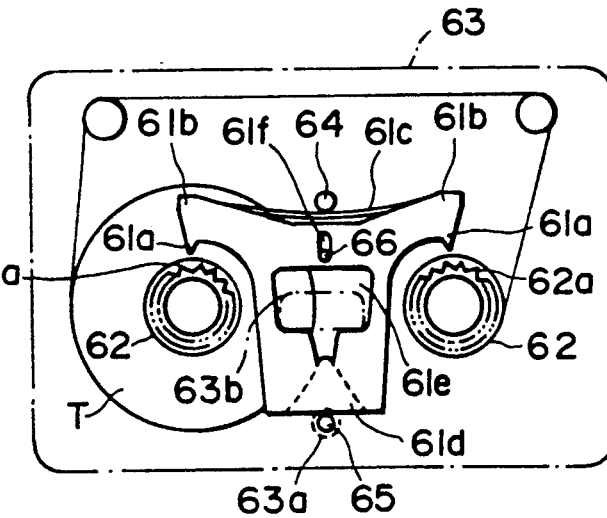
Figure 4:
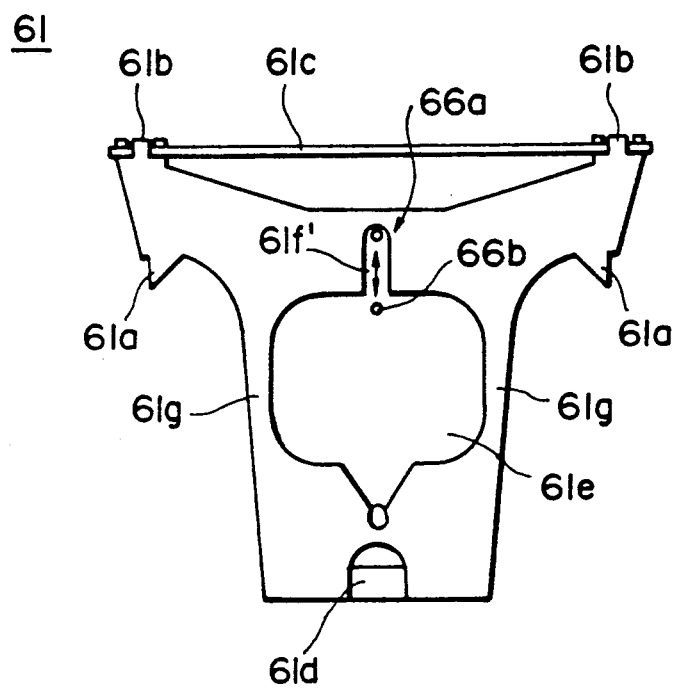
FIG. 4 is a plan view of the brake member in the prior art, illustrating a guide recess.
Figure 5:
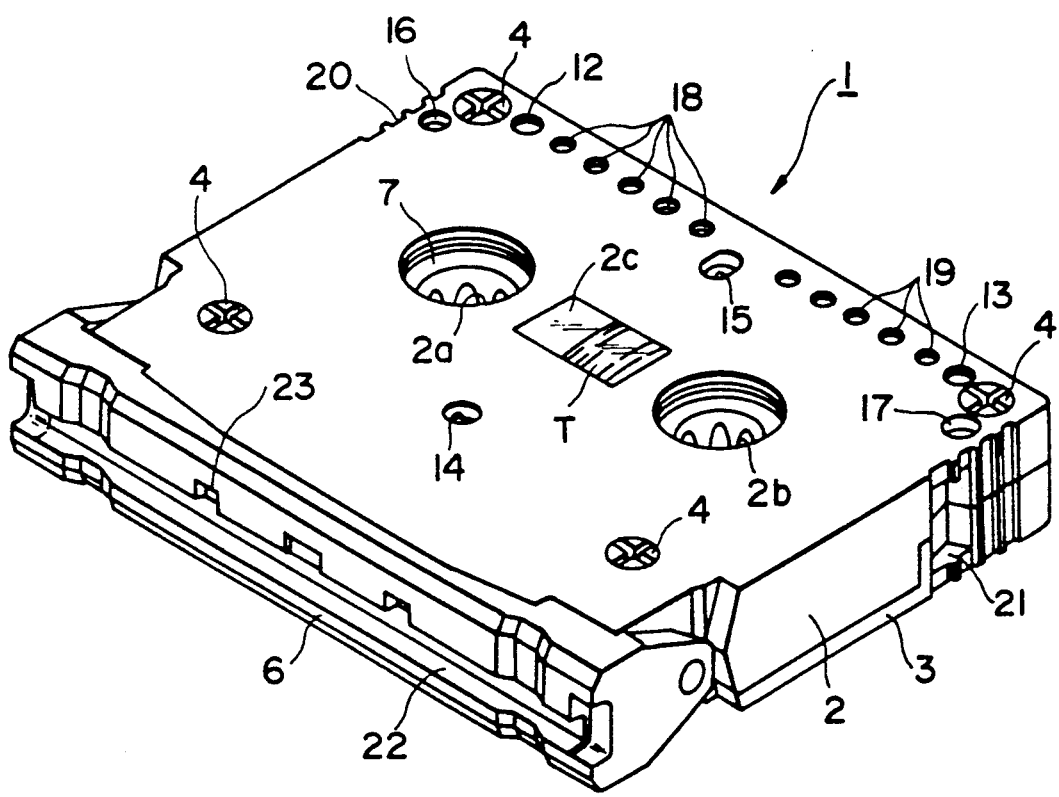
FIG. 5 is a perspective view of the tape cassette in a preferred embodiment of the present invention.

Referring to FIG. 5, reference numeral 1 generally designates a cassette case of the tape cassette for accommodating a magnetic tape for recording and reproducing a PCM signal, for example. The cassette case 1 is constructed of an upper half 2 and a lower half 3 opposed to each other and combined together by tightening a plurality of screws 4. An opening 5 is formed on a front side of the cassette case 1, and a lid 6 for opening and closing the front opening 5 is rotatably supported to the cassette case 1.

Figure 6:
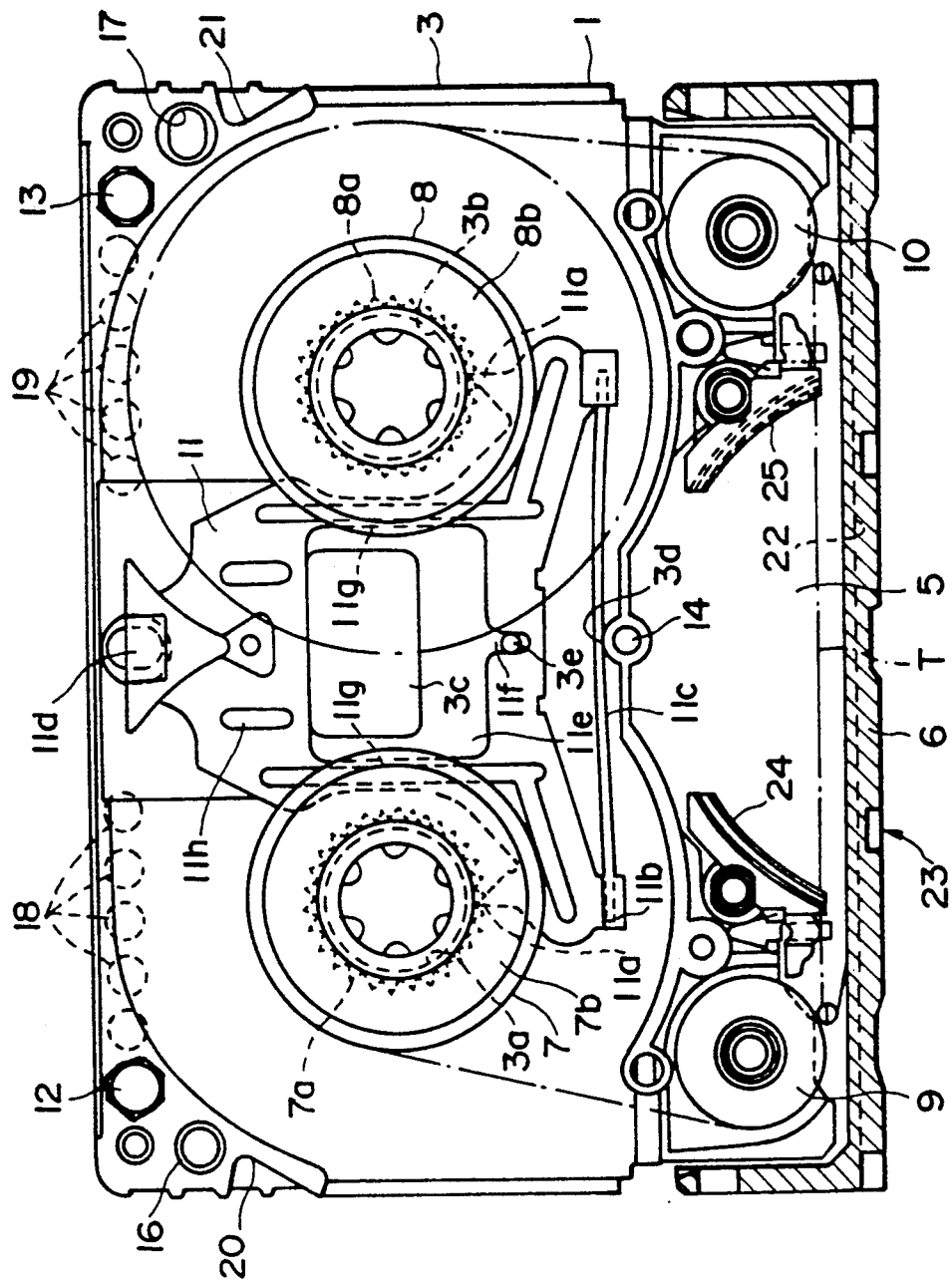
FIG. 6 is a top plan view of the tape cassette with an upper half removed, illustrating a mounted condition of the brake member in the tape cassette shown in FIG. 5.

As shown in FIGS. 5 and 6, the upper half 2 is provided with a pair of shaft insert holes 2a and 2b for receiving first and second hub driving shafts, respectively, and the lower half 3 is provided with a pair of shaft insert holes 3a and 3b for receiving the first and second hub driving shafts, respectively. The shaft insert holes 2a and 2b of the upper half 2 are aligned with the shaft insert holes 3a and 3b of the lower half 3, respectively. A pair of hubs 7 and 8 having respective radially extending portions 7b and 8b are accommodated in the cassette case 1, that is, between the upper half 2 and the lower half 3 so as to correspond to the shaft insert holes 2a and 3a and the shaft insert holes 2b and 3b, respectively. A magnetic tape T is wound around both the hubs 7 and 8 in the cassette case 1. A pair of pinch rollers 9 and 10 serving also as guide rollers are rotatably supported by the cassette case 1 at front, left and right positions on opposite sides of the front opening 5. The magnetic tape T is partially exposed at the front opening 5 under a stretched condition between the pinch rollers 9 and 10.

A pair of left and right accidental erasing protectors 12 and 13 are provided at a rear marginal portion of the cassette case 1 so as to pass through the upper half 2 and the lower half 3. A pair of front and rear positioning reference holes 14 and 15 are formed at a longitudinally central portion of the cassette case 1 so as to pass through the upper half 2 and the lower half 3, and a pair of left and right positioning reference holes 16 and 17 are formed at the rear marginal portion of the cassette case 1 so as to pass through the upper half 2 and the lower half 3. Further, a plurality of detection holes 18 and 19 are formed at the rear marginal portion of the cassette case 1 so as to be arranged in a line in the longitudinal direction of the cassette case 1. A pair of left and right grip portions 20 and 21 are formed on opposite side surfaces of the cassette case 1 near a rear end thereof.

The lid 6 for opening and closing the front opening 5 of the cassette case 1 is provided with a longitudinally extending guide groove 22 and a pair of changer engaging portions 23 adjoining to the guide groove 22.

A pair of upper and lower windows 2c and 3c are provided at central portions of the upper half 2 and the lower half 3, respectively. The windows 2c and 3c are formed of transparent resin, so that a residual quantity of the magnetic tape T for recording or reproduction can be confirmed from the outside of the cassette case 1 through the windows 2c and 3c.

As shown in FIG. 6, there is provided in the cassette case 1 a brake member 11 having for example a spring holding portion 11b for braking both the hubs 7 and 8 in an inoperative condition of the tape cassette. When the tape cassette is loaded into a tape player, a positioning pin serving as a brake release pin of the tape player is inserted from the positioning reference hole 15 into the cassette case 1, thereby sliding the brake member 11 in such a direction as to unlock the hubs 7 and 8, so that the hubs 7 and 8 are brought into a rotatable condition.

That is, in the inoperative condition of the tape cassette, a brake spring 11c formed from a stainless steel wire, for example, which is supported at its opposite ends by two spring holding portions $11b_1$ and $11b_2$ of the brake member 11 (see FIG. 9A), is in pressure contact with an abutment portion 3d provided in the cassette case 1, thereby giving a biasing force to the brake member 11. Accordingly, a pair of engaging pawls 11a of the brake member 11 are in engagement with engaging teeth 7a and 8a like gear rings (inner hubs) of the hubs 7 and 8 to maintain a locked condition of the hubs 7 and 8. When the tape cassette is loaded into the tape player, the positioning pin is inserted from the positioning reference hole 15 into the cassette case 1, and it serves as a brake release pin to come into contact with an inclined cam portion 11d of the brake member 11. As shown in FIG. 9B, the inclined cam portion 11d has a sectionally V-shaped cam surface inclined with respect to a thickness direction of the cassette case 1. Accordingly, when the positioning pin comes into contact with the cam surface of the inclined cam portion 11d, the brake member 11 is slid against the biasing force of the brake spring 11c as being guided by a guide pin 3e inserted into a guide hole 11f of the brake member 11. As a result, the engaging pawls 11a of the brake member 11 are disengaged from the engaging teeth 7a and 8a of the hubs 7 and 8, thus bringing the hubs 7 and 8 into a rotatable condition.

The tape cassette in this preferred embodiment is of a double-sided recordable and reproducible type, and the cam surface of the inclined cam portion 11a is therefore formed in a sectional V-shape so that the locked condition of the hubs 7 and 8 can be released irrespective of whichever surface of the tape cassette is directed to an upper side in loading the tape cassette into the tape player. However, in another type tape cassette with a one-way recording format, it is unnecessary to form the cam surface into a vertical V-shape.

An aperture 11e is formed at a central portion of the brake member 11 so as to correspond to the windows 2c and 3c of the upper half 2 and the lower half 3. The aperture 11e has a size large enough that the structure forming the aperture 11e does not overlap either of the windows 2c and 3c over a sliding stroke of the brake member 11.

In the tape cassette as constructed above, the magnetic tape T accommodated in the cassette case 1 is recorded and reproduced in a helical scan fashion by a rotary head 41.

Figure 7:
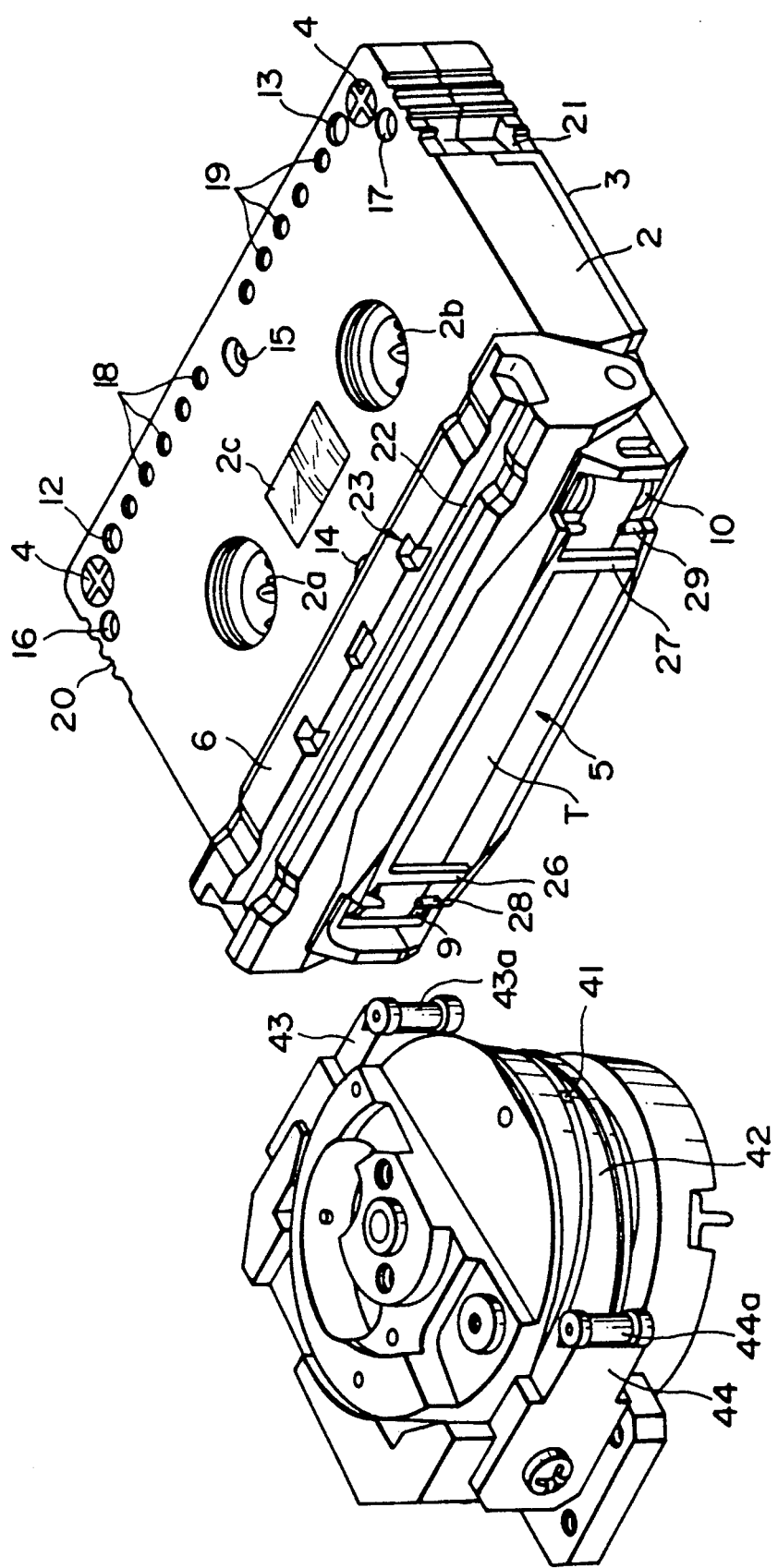
FIG. 7 is a perspective view of the tape cassette and a head drum before loading the tape cassette.

As shown in FIG. 7, the rotary head 41 is designed to be rotated relative to a head drum 42 at a predetermined inclined angle with respect thereto. In loading the tape cassette into the tape player, the lid 6 of the cassette case 1 is rotated upwardly or downwardly to make the front opening 5 to be exposed to the head drum 42. The head drum 42 is then partially inserted from the front opening 5 of the cassette case 1, and the magnetic tape T stretched across the front opening 5 comes into contact with a circumferential surface of the inserted portion of the head drum 42. In recording and reproducing the magnetic tape T, the rotary head 41 contacting the magnetic tape T is rotated, and the magnetic tape T is slid on the circumferential surface of the head drum 42 to form an inclined track crossing the magnetic tape T.

Figure 8:
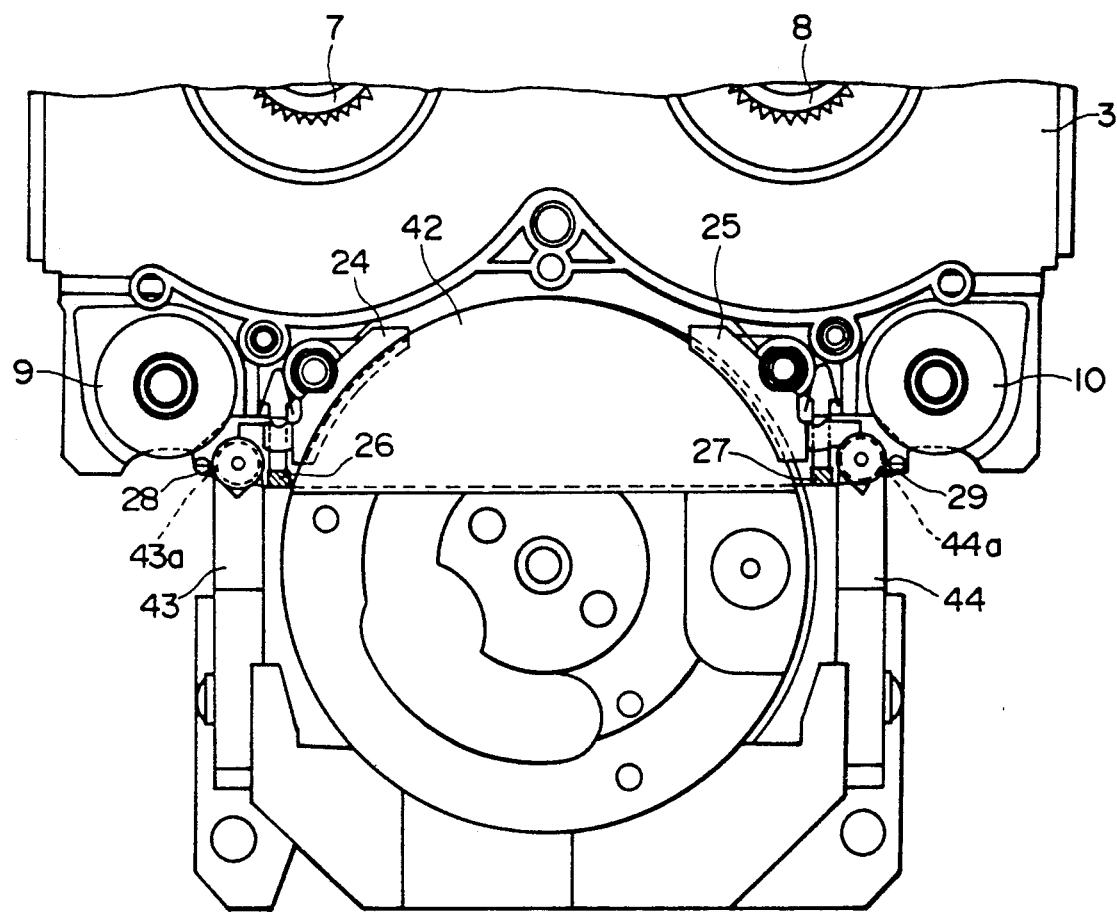
FIG. 8 is a plan view of the head drum partially inserted into the tape cassette.

In order to ensure the sliding contact of the magnetic tape T with the head drum 42, a pair of tape guide members 24 and 25 are located just behind the front opening 5 in the cassette case 1 at left and right positions inside the guide rollers 9 and 10, respectively. The tape guide members 24 and 25 are swingable and movable in the longitudinal direction of the cassette case 1. The tape guide members 24 and 25 have respective guide surfaces inclined vertically in reverse directions with respect to each other. Accordingly, when the head drum 42 is inserted from the front opening 5 as shown in FIG. 8, the guide surfaces of the tape guide members 24 and 25 are brought into contact with the circumferential surface of the head drum 42 through the magnetic tape T. That is, the magnetic tape T is nipped between the guide surfaces of the tape guide members 24 and 25 and the circumferential surface of the head drum 42 so as to be guided by the tape guide members 24 and 25.

A pair of wing guides 43 and 44 are provided on the opposite sides of the head drum 42. In loading the tape cassette into the tape player, the wing guide 43 is inserted between the pinch roller 9 and the tape guide member 24, and the wing guide 44 is inserted between the pinch roller 10 and the tape guide member 25. A pair of rollers 43a and 44a are mounted on the front ends of the wing guides 43 and 44, respectively, so as to bring the magnetic tape T into pressure contact with the tape guide members 24 and 25.

A pair of supports 26 and 27 are provided at left and right end portions of the front opening 5 of the cassette case 1, and a pair of guide projections 28 and 29 for preventing extrusion of the magnetic tape T are provided outside the supports 26 and 27, respectively. That is, the guide projection 28 is located between the support 26 and the pinch roller 9, and the guide projection 29 is located between the support 27 and the pinch roller 10. In loading the tape cassette into the tape player, the roller 43a of the wing guide 43 is inserted between the support 26 and the guide projection 28, and the roller 44a of the wing guide 44 is inserted between the support 27 and the guide projection 29.

In the tape cassette as constructed above, the construction of the brake member 11 provided in the cassette case 1 will now be described in more detail.

FIGS. 9A, 9B, 9C, 9D, and 9E are a top plan view of the brake member 11, a cross section taken along the line B—B in FIG. 9A, a fragmentary side view of the spring holding portion $11b_1$, a bottom plan view of the brake member 11, and an elevational view of the brake member 11.

In the brake member 11 in this preferred embodiment, the inclined cam portion 11d having the vertically V-shaped cam surface inclined with respect to a thickness direction of the cassette case 1 is molded from resin. The brake spring 11c is formed from a stainless steel wire. The other portion of the brake member 11 is formed from a thin-walled sheet metal (e.g., SUS; nonmagnetic material) having a thickness of about 0.1 mm, and it is fixedly connected with the inclined cam portion 11d by insert molding.

The sheet metal portion is formed with a plurality of beads 11h for improving a rigidity, and a top portion $11h_t$ of each bead 11h serves as a slide portion adapted to slide on an inner surface of the cassette case 1.

As shown in FIG. 9B, the spring holding portion $11b_2$ is bent and crimped so as to surround one end of the brake spring 11c, thereby completely fixing the one end of the brake spring 11c. On the other hand, as shown in FIG. 9C, the spring holding portion $11b_1$ is formed as a stepped portion, and the other end of the brake spring 11c is merely supported by the stepped portion rather than being completely fixed.

In this way, the one end of the brake spring 11c is completely fixed to the spring holding portion $11b_2$ of the spring member 11, so that there is no possibility of the brake spring 11c becoming disconnected from the spring holding portions 11$b_1$ and 11$b_2$. Accordingly, there is no risk of deterioration in brake operation and brake function due to the disconnection of the brake spring 11c. Further, the fixing of the brake spring 11c to the brake member 11 can be carried out in a manufacturing step of the brake member 11. That is, it is unnecessary to install the brake spring 11c after manufacturing the spring member 11, thus improving workability and reducing the manufacturing cost.

As mentioned above, the body of the brake member 11 has a composite construction composed of a resin portion and a sheet metal portion. In particular, the spring holding portion 11$b_1$ and/or the spring holding portion 11$b_2$ are/is formed by sheet metal working, thereby providing a room in dimension in the thickness direction of the cassette case 1 as compared with the case of resin molding. Accordingly, the brake spring 11c can be fixed by bending or spot welding of the spring holding portion 11$b_2$. Thus, the fixing of the brake spring 11c can be carried out easily and securely.

Further, as the inclined cam portion 11d is molded from resin, it has a suitable wear resistance to the positioning pin (brake release pin) to be inserted from the positioning reference hole 15. Moreover, as the top portion 11ht of each bead 11h formed on the sheet metal portion of the spring member 11 serves as a slide portion adapted to slide in line contact with the inner surface of the cassette case 1, smoothness of a sliding operation of the brake member 11 can be ensured.

As mentioned above, the aperture 11e is formed at the central portion of the brake member 11, so as not to hinder the confirmation of a residual quantity of the magnetic tape T from the outside of the cassette case 1 through the windows 2c and 3c of the cassette case 1. As a result, the central portion of the brake member 11 is constructed of a pair of side portions 11g only. However, since the side portions 11g are also formed by sheet metal working, and the beads 11h are also formed on the side portions 11g, a sufficient rigidity of the side portions 11g can be obtained. Accordingly, there is no possibility of the side portions 11g being flexed in the sliding operation of the spring member 11, thereby achieving smooth locking and unlocking operations. Further, there is no risk that tape running may be hindered by the spring member 11 because of flexing of the side portions 11g.

As another supporting method for the brake spring 11c at the spring holding portion 11$b_1$, the spring holding portion 11$b_1$ may be formed so as to surround the brake spring 11c with a clearance defined therebetween as shown in FIGS. 10A and 10B. According to this supporting method, the disconnection of the brake spring 11c from the spring holding portion 11$b_1$ can be almost completely prevented. Further, at the spring holding portion 11$b_2$ for completely fixing the one end of the brake spring 11c, the one end of the brake spring 11c may be fixed to the spring holding portion 11$b_2$ by spot welding.

In case of molding the entirety of the brake member 11 except the brake spring 11c from resin as shown in FIGS. 11A, 11B and 11C, one end of the brake spring 11c may be completely fixed to the spring holding portion 11$b_2$ by insert molding, and the other end of the brake spring 11c may be nipped by the spring holding portion 11$b_1$ which is formed in a zigzag shape in the same manner as in the prior art.

Next, another preferred embodiment of the guide recess of the brake member will now be described with reference to FIGS. 12A and 12B. The guide recess 11f continues to the aperture 11e, and a continuing portion therebetween, that is, an opened one end of the guide recess 11f is divergent to form a tapering portion defined by beveled edges 11fx and 11ft. While such a tapering portion of the guide recess 11f in the previous preferred embodiment is rounded as shown in FIGS. 9A to 9E, the tapering portion in this preferred embodiment is straight.

Figure 12A:
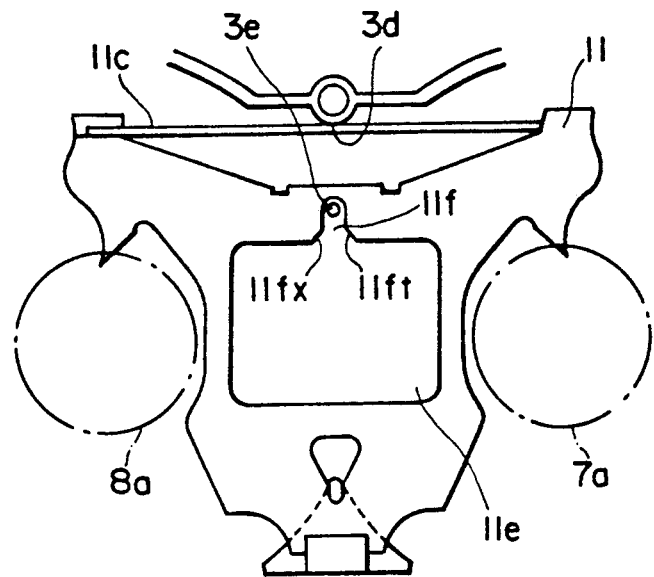
FIGS. 12A and 12B are plan views of the brake member having a guide recess in a further preferred embodiment of the present invention, illustrating the operation thereof.
Figure 12B:
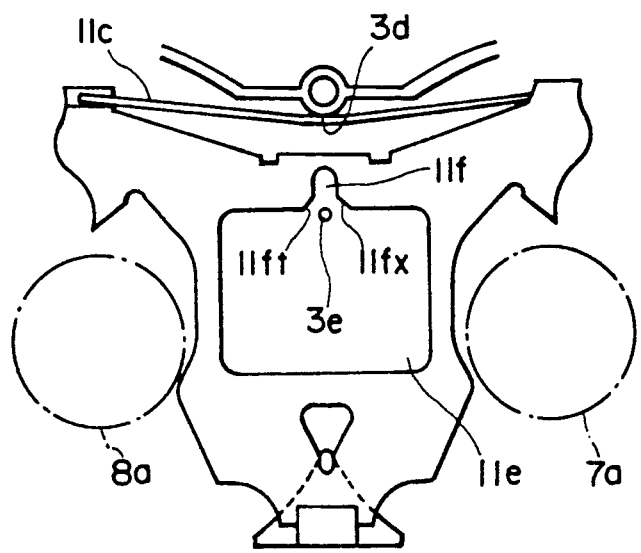

When the brake member 11 is slid from the hub locked position shown in FIG. 12A to the hub unlocked position shown in FIG. 12B, the guide pin 3e comes away from the guide recess 11f to a position in the aperture 11e. Thereafter, while the brake member 11 is slid to restore the hub locked position, the guide pin 3e is guided by the tapering portion 11ft to be smoothly introduced into the guide recess 11f.

Even if the brake member 11 is somewhat slipped in position in the hub unlocked condition or upon sliding to the hub locked position, there is no risk that the guide pin 3e cannot be introduced into the guide recess 11f. Accordingly, the hub locking function of the brake member 11 can be always properly exhibited in this preferred embodiment.

It is to be noted that the shape and the material of the brake member in the present invention are not limited to those illustrated in the above preferred embodiment, but they may be modified according to a size, usage, shape, etc. of a tape cassette to which the present invention is applied.

What is claimed is:

1. In a tape cassette including a magnetic tape, a pair of hubs for winding said magnetic tape therearound, a brake member adapted to be slidably moved towards and away from circumferential surfaces of said hubs, and a spring member elongate along a spring axis and having respective opposite ends, said spring member being supported by said brake member adjacent to said respective opposite ends, and said brake member being biased by said spring member to come into pressure contact with said circumferential surfaces of said hubs; the improvement wherein one end of said spring member is fixed to said brake member, and the other end of said spring member is supported by said brake member with a degree of freedom parallel to said spring axis so that, during operation of said brake member, said one end of said spring member remains stationary relative to said brake member and said other end of said spring member slides relative to said brake member in a direction parallel to said spring axis.

2. The tape cassette as defined in claim 1 wherein said brake member is molded from resin, and said one end of said spring member is fixed to said brake member by insert molding.

3. The tape cassette as defined in claim 1 wherein said brake member is provided with a nipping portion for nipping said other end of said spring member, so that said other end of said spring member is supported by said nipping portion.

4. The tape cassette as defined in claim 1 wherein said spring member has a wire-shaped configuration.

5. The tape cassette as defined in claim 1 wherein said brake member includes a sheet metal portion, and said spring member is fixed to said sheet metal portion of said brake member.

6. The tape cassette as defined in claim 5 wherein said spring member is fixed to said brake member by sheet metal working.

7. The tape cassette as defined in claim 5 wherein said spring member is fixed to said brake member by welding.

8. In a tape cassette including a magnetic tape, a pair of hubs for winding said magnetic tape therearound, and a hub braking mechanism for locking and unlocking said hubs, comprising a brake member adapted to be slidably moved towards and away from circumferential surfaces of said hubs, and a spring member elongate along a spring axis and having respective opposite ends, said spring member being supported by said brake member adjacent to said respective opposite ends for biasing said brake member to effect sliding movement of said brake member, wherein one end of said spring member is fixed to said brake member, and the other end of said spring member is supported by said brake member with one degree of freedom parallel to said spring axis so that, during operation of said brake member, said one end of said spring member remains stationary relative to said brake member and said other end of said spring member slides relative to said brake member in a direction parallel to said spring axis.

9. The tape cassette as defined in claim 8 wherein said brake member is molded from resin, and said one end of said spring member is fixed to said brake member by insert molding.

10. The tape cassette as defined in claim 8 wherein said brake member is provided with a nipping portion for nipping said other end of said spring member, so that said other end of said spring member is supported by said nipping portion.

11. The tape cassette as defined in claim 8 wherein said spring member has a wire-shaped configuration.

12. The tape cassette as defined in claim 8 wherein said brake member includes a sheet metal portion, and said spring member is fixed to said sheet metal portion of said brake member.

13. The tape cassette as defined in claim 12 wherein said spring member is fixed to said brake member by sheet metal working.

14. The tape cassette as defined in claim 12 wherein said spring member is fixed to said brake member by welding.

* * * * *